Dec. 8, 1953   P. F. DOUGHERTY ET AL   2,662,042
PROCESS FOR CLEANING REFINING EQUIPMENT
Filed Feb. 1, 1950
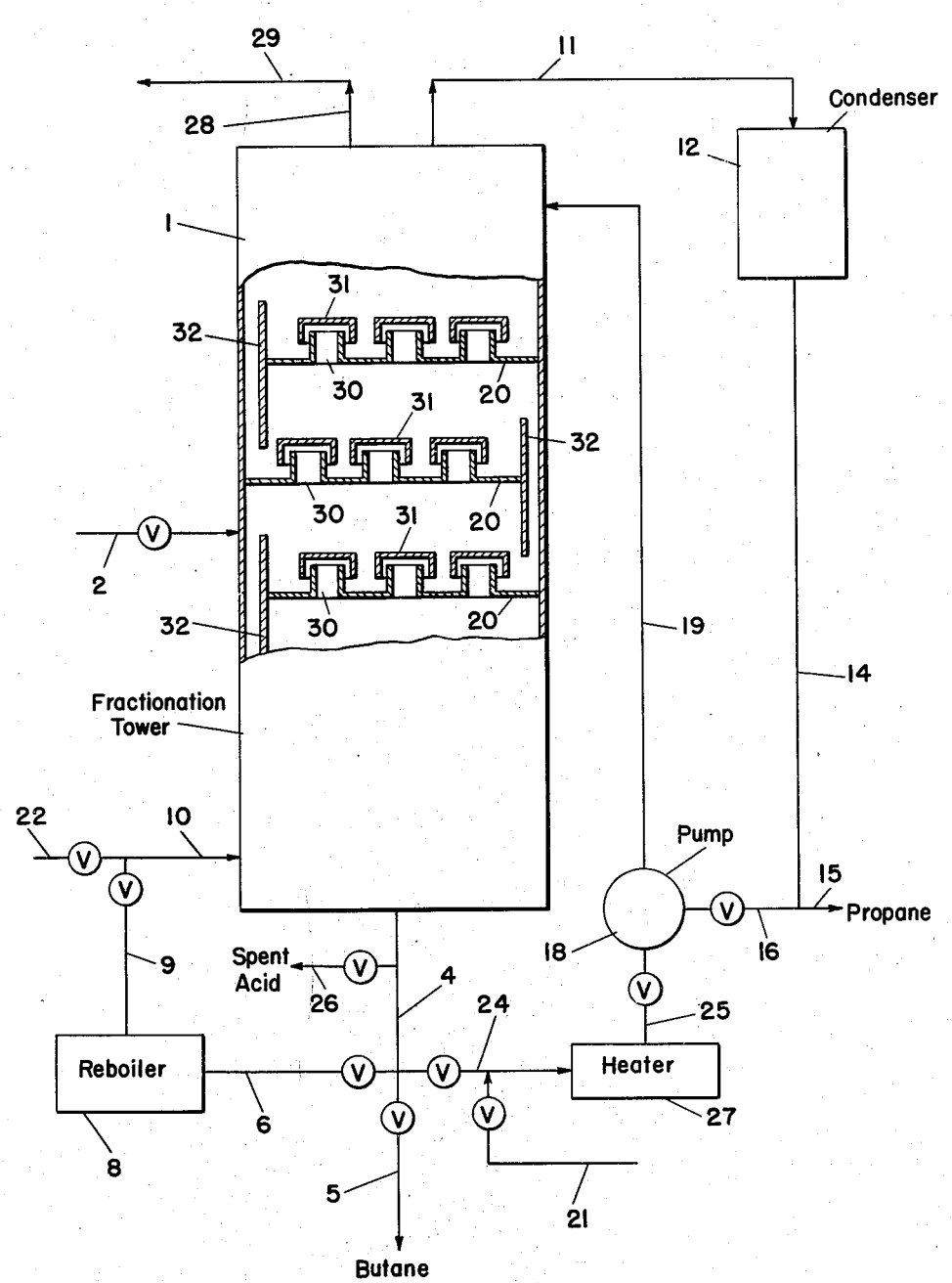
INVENTORS.
PATRICK F. DOUGHERTY
LLOYD G. MAGILL
BY
Busser and Harding
ATTORNEYS

UNITED STATES PATENT OFFICE 2,662,042

PROCESS FOR CLEANING REFINING EQUIPMENT

Patrick F. Dougherty, Chester Heights, and Lloyd G. Magill, Parkland, Pa., assignors to Sun Oil Company, Philadelphia, Pa., a corporation of New Jersey Application February 1, 1950, Serial No. 141,691

7 Claims. (Cl. 134—22)

This invention relates to a process for cleaning petroleum refinery equipment, and more particularly relates to a process for the removal of scale and other foreign materials from fractionation towers and like equipment.

Scale, usually in the form of a crust of metallic oxides, is frequently observed on the interior surfaces of refinery equipment. For example, in absorption towers wherein mixtures of normally gaseous hydrocarbons are contacted with an absorption oil to selectively absorb certain components of the gaseous mixture, the feed to the absorption tower frequently contains a substantial proportion of water, hydrogen sulfide or both. Under such conditions, scale, metallic sulfides, or both, form on the metal surfaces. Scale contacted by circulating absorption oil tends to become separated from the metal surfaces and contaminates the oil. This results in the plugging of pipes and valves through which the contaminated oil passes. Also, the gas or liquid passages, or both, within the absorption tower may become plugged, thereby reducing the efficiency of the tower. Plugging of the orifices may result from a building up of the scale thereon, as well as by detached scale. The same difficulty is observed with fractionating towers similar in design to absorption towers.

Heretofore, scale has been removed from such refinery equipment by discontinuing normal operation, removing the absorption oil, and completely filling the tower with a cleaning agent effective to remove the scale, such as a pickling agent, e. g., inhibited hydrochloric acid. It has heretofore been considered essential to completely fill the equipment in order to contact the contaminated surfaces the cleaning of which was considered necessary. In such process, the pickling agent is permitted to remain in the absorption tower until the scale is detached from the surfaces, at which time the acid is removed and the tower flushed with a copious amount of water in order to dislodge and remove the foreign materials trapped in the various portions of the apparatus, such as bubble trays. The downflow of water is impeded by bubble trays, and hence complete removal of foreign material is usually not accomplished. This method of cleaning absorption towers requires the use of a large quantity of the cleaning agent, and hence is expensive and presents a difficult disposal problem. Storage of such a large quantity of a pickling agent is not practical in refinery practice. The same difficulty is observed in the cleaning of fractionation towers. The tower designs used in fractionation and absorption towers are comparable, and hence reference to one includes the other, the expression "fractionating tower" being intended as generic to both.

It is an object of the present invention to provide a rapid and economical process for removing scale from refinery equipment. A further object is to provide a process for the cleaning of fractionation towers employing only relatively small amounts of the cleaning agent. Other objects appear hereinafter.

It has now been found that foreign materials, such as scale and metallic salts, may be removed from the interior surfaces of fractionation towers by continuously introducing an aqueous cleaning solution, such as a pickling agent, into the top of the tower and simultaneously and continuously introducing a gas inert to the action of such pickling solution into the bottom of the tower, as hereinafter fully described. In this process, the pickling solution contacts the same metal surfaces as does the absorption oil in normal operation, and such surfaces are effectively cleaned by the action of the pickling solution. The ascending inert gas provides agitation on the bubble trays whereby the foreign materials are flushed from the trays and ultimately are carried out through the bottom of the tower. By the expression, "inert gas," as used herein, is meant a gas substantially inert to the action of the aqueous cleaning agent.

To illustrate the process of the present invention, when an absorption or fractionation tower becomes fouled or coated with scale, normal operation thereof is discontinued and an aqueous cleaning solution, preferably a pickling solution, is continuously introduced into the tower top while simultaneously introducing an inert gas into the tower bottom. Scale and the like is removed from the interior surfaces of the tower at every point contacted by liquid in normal operation of the tower, and is carried out through the bottom of the tower, the ascending gas providing agitation to prevent settling on the bubble trays. Advantageously, such foreign materials are removed from the pickling agent by settling, straining or filtering, and the agent continuously recycled. In this manner, the quantity of cleaning material needed in the process is maintained at a minimum. When the pickling agent becomes exhausted, make-up acid may be added, or the exhausted agent may be discarded. In some instances oxides formed on the walls of the tower which are not contacted by liquid during normal operation serve as a protective coating to prevent further oxidation or other attack on the surface. Since this coating is not in contact with liquid during normal operation, it is not removed in the present process, and this is considered a special advantage. Thus, removal of such coating, such as by filling the tower with a pickling agent, results in further attack on the surface on resuming normal operation. Also, the acid of the pickling agent is consumed in this removal without securing a useful result.

Referring now to the drawing, numeral 1 represents a fractionation tower of common design, the present tower being used to separate propane from butane. In normal operation, a mixture of propane and butane is introduced into tower 1 through line 2, such introduction being at about the center of the tower. Butane descends in the tower and passes out through line 4, a portion thereof being taken as product through line 5, and the remainder passing through line 6 into re-boiler 8, wherein it is heated and returned to tower 1 through lines 9 and 10. Propane is taken as overhead through line 11, passes through condenser 12, and a portion thereof taken as product through lines 14 and 15. The remaining portion is returned to the top of the tower as reflux through line 16, pump 18, and line 19. The bubble trays, as illustrated by 20, are of common design and provide for intimate mixing of ascending gas with descending liquid.

In accordance with the present process, when the tower becomes fouled with scale, normal operation is discontinued and a pickling agent introduced into the tower top, such as through lines 21 and 24, heater 27, pump 18, and line 19, the heater being used to obtain the desired temperature of the solution, as hereinafter defined. An inert gas, which may advantageously be a refinery dry gas, is introduced into the tower bottom such as through lines 22 and 10. The pickling agent may be recycled to the process through lines 4, 24, heater 27, line 25, pump 18 and line 19, or it may be removed through lines 4 and 26, in which case it may be regenerated or discarded. Also, it is advantageous to include a strainer or settler (not shown) before heater 27 to remove the foreign particles. The ascending inert gas is removed from the tower top, for example, through lines 28 and 29, and may be recycled to the process or discarded. It is preferred to discard the effluent gas, since it may contain entrained acid and gases evolved during the process, such as hydrogen sulfide.

The operation of the valves shown in the drawing will be apparent to those skilled in the art, as will the location and operation of other valves, pumps, and the like.

In the present cleaning process, the pickling solution is contacted with every portion of the apparatus normally contacted by the liquefied hydrocarbons in normal operation by the tower, and such surfaces are effectively cleaned. Thus, ascending gas passes through orifices illustrated by 30 and are deflected into the liquid contained on bubble trays 20 by bubble cap 31. The ascending gas thus prevents any substantial proportion of liquid from flowing down through orifice 30. The liquid flows over the barriers illustrated by 32, and the ascending gas provides agitation on the bubble trays sufficient to flush any suspended solids over such barriers, such suspended solids ultimately reaching and being removed from the tower bottom. However, the interior surfaces of the orifices become coated with scale, and it is desired to contact such surfaces with the cleaning agent. This may be accomplished by discontinuing the input of inert gas so that the pickling agent on the trays flows down through the orifices rather than over the barriers. Accordingly, it is a preferred embodiment to discontinue the input of inert gas during a portion of the cleaning process. This may advantageously be done at spaced intervals depending upon the size and design of the particular apparatus being cleaned. During the time inert gas is not supplied, solids are not flushed from the trays, and hence it is preferred to introduce inert gas during about the last half of the process in order to insure complete removal of suspended scale and foreign particles. Thus, the gas is preferably introduced at intervals during the initial portion of the process, say for about ½ of the total time, and continuously during the latter or remaining portion of the process. On completion of the process, the pickling agent is removed from the tower, such as by flushing with water, and normal operation then resumed. From the foregoing, it is apparent that the present invention is especially valuable in refining equipment containing vertically spaced trays designed to retain a portion of liquid thereon, and particularly where the descending liquid therein takes a different course when gas is ascending in the tower than when there is no gas flow.

To illustrate the advantages obtained by the process of the present invention, the fractionating column employed in a process as above described, having an inside diameter of 4 feet, a height of 62.4 feet and containing 30 bubble trays, was used in the separation of propane from butane, as above described. Gas input was at the rate of 700 cu. ft./min., the tray holdup of liquid during the operation being 1,077 gals. Liquid was introduced into the tower top, as reflux, at a rate of about 80 gals./min. A decrease in operating efficiency of the tower of about ⅓ was observed, the decrease being due to a plugging of the bubble caps with scale. To clean such scale manually is time consuming and impracticable, whereas in order to fill the tower with a pickling agent, there would be required 5,830 gals. of pickling agent. In accordance with the present invention, the tower is rapidly and efficiently cleaned by employing a total of about 1,500 gals. of pickling agent, preferably inhibited hydrochloric acid, the inert gas being introduced at approximately the same rate as the gas during normal operation, namely, at about 700 cu. ft./min. The slot velocity of the ascending gas, in general, should be maintained within the range of from 1 to 10 ft./sec., i. e., the linear velocity of gas passing through the bubble caps of the trays, or the slots in the bubble caps, depending on the particular design thereof, should be within the stated range. Also, the pickling agent is introduced at about the same rate as liquid during normal operation, namely, at a rate of about 80 gals./min., the rate always being maintained insufficient to flood the tower. In the present example, a total time of about 4 hours is required to remove the scale. As above described, the inert gas is preferably supplied at intervals during the first portion of the process. In the present tower, the inert gas may be supplied for about 15 minutes, then discontinued for about 15 minutes, and this cycle repeated for 2 hours, after which the gas is continuously supplied until the process is complete.

Pickling agents which may advantageously be employed in the present invention include hydrochloric, sulfuric and nitric acids, and mixtures thereof, generally at a concentration of from about 5 to 15% by weight. Preferably an inhibitor is employed to reduce the action of the acid on metal. Inhibitors such as pyridine and substituted thioureas, e. g., dibutylthiourea, usually in a concentration of about 0.05% by weight of the pickling solution, give good results. In general, the temperature of the pickling agent during the process should be maintained from about 130° F. to 180° F., the particular pickling agent, inhibitor and temperature to employ depending on the particular apparatus to be cleaned. For removing some types of foreign materials an aqueous alkaline solution, such as an aqueous solution of sodium hydroxide, potassium hydroxide or trisodium phosphate may be employed. Also in some instances it may be desirable to employ treatment with an alkaline solution or other detergent in the present process prior to treatment with a pickling agent.

As the inert gas to employ, a preferred embodiment is the use of the same gas used in normal operation of the apparatus. However, such gas is usually valuable and entrainment of acid and gases such as hydrogen sulfide, which may be evolved during the process, may make subsequent processing difficult, in which case it is preferred to employ a refinery dry gas, consisting principally of a mixture of methane, ethane and a small quantity of other materials, such as propane and hydrogen. It is usually feasible to discard such gas after use. Other inert gases may be employed, such as air, carbon dioxide, or nitrogen.

The present process, in addition to removing scale, metallic oxides and metallic sulfides, may remove tars and resins which frequently accumulate in fractionation towers. It is believed that the present cleaning agents attack the binding material between such materials and the metal surfaces, the loosened tars and resins then being removed by the flushing action of the circulating acid.

We claim:

1. Process for removing scale deposited during normal operation of a fractionation tower containing vertically spaced bubble trays designed to retain liquid thereon which comprises continuously introducing an aqueous cleaning solution into the top of said tower while simultaneously introducing a gas inert to said aqueous cleaning solution into the tower bottom, passing said inert gas up through said bubble trays thereby providing agitation on said trays of a mixture of scale and cleaning solution whereby said mixture is flushed over the barriers of said trays, and removing cleaning solution contaminated with scale from the tower bottom.

2. Process according to claim 1 wherein the aqueous cleaning solution is a pickling agent.

3. Process according to claim 1 wherein the aqueous cleaning solution is inhibited hydrochloric acid.

4. Process according to claim 1 wherein the aqueous cleaning solution is an aqueous alkaline solution.

5. Process for removing scale from fractionation towers containing vertically spaced bubble trays which comprises continuously introducing a pickling solution into the top of said tower at a rate approximately equal to the rate of introduction of liquid thereto during normal operation of the tower, and simultaneously introducing a gas inert to said pickling solution into the tower bottom at a rate approximately equal to the rate of introduction of gas to said tower during normal operation of the tower, whereby a mixture of said pickling solution and scale contained on said trays is flushed over the barriers thereof, and removing pickling solution contaminated with scale from the tower bottom.

6. Process according to claim 5 wherein said gas is introduced at spaced intervals during the initial portion of the process and continuously during the latter portion of the process.

7. Process for removing scale from fractionation towers containing vertically spaced bubble trays which comprises continuously introducing aqueous inhibited hydrochloric acid into the top of said tower at a rate approximately equal to the rate of introduction of liquid thereto during normal operation of the tower, and simultaneously introducing a refinery dry gas into the tower bottom at a rate approximately equal to the rate of introduction of gas to said tower during normal operation of the tower, whereby a mixture of said aqueous inhibited hydrochloric acid and scale is flushed over the barriers of said trays, and removing inhibited hydrochloric acid contaminated with scale from the tower bottom, the temperature of the acid being maintained within the range of from about 130° F. to about 180° F.

PATRICK F. DOUGHERTY.
LLOYD G. MAGILL.

References Cited in the file of this patent

UNITED STATES PATENTS

| Number | Name | Date |
|---|---|---|
| 578,746 | Hinman | Mar. 16, 1897 |
| 1,545,498 | Klinger | July 14, 1925 |
| 2,158,992 | Cook | May 16, 1939 |
| 2,433,060 | Ohsol | Dec. 23, 1947 |
| 2,578,670 | Carleton | Dec. 18, 1951 |